United States Patent

[11] 3,594,960

| [72] | Inventor | Louis Fourquier<br>26 Montelier, Drome, France |
|---|---|---|
| [21] | Appl. No. | 739,856 |
| [22] | Filed | June 25, 1968 |
| [45] | Patented | July 27, 1971 |
| [32] | Priority | June 28, 1967 |
| [33] | | France |
| [31] | | 748 |

[54] APPARATUS FOR HOLDING CHUCK JAWS FOR SHAPING
5 Claims, 3 Drawing Figs.

[52] U.S. Cl. .................................................. 51/217 R,
82/34 R, 269/152, 279/1 R
[51] Int. Cl. .................................................. B24b 41/06,
B23b 3/36, B25b 1/00

[50] Field of Search............................................. 82/34;
51/217; 279/1 SGR. 106; 269/152, 106, 104

[56] References Cited
UNITED STATES PATENTS

| 2,925,282 | 2/1960 | Borsetti.......................... | 279/1 UX |
| 3,160,042 | 12/1964 | Grand ............................ | 82/34 |
| 289,861 | 12/1883 | Schrepel....................... | 269/152 X |

*Primary Examiner*—Harold D. Whitehead
*Attorney*—Robert E. Burns

ABSTRACT: A device having an annular plate with a plurality of clamps angularly disposed and arranged on one face of the plate to immobilize the jaws of a chuck for retouching of the bearing faces.

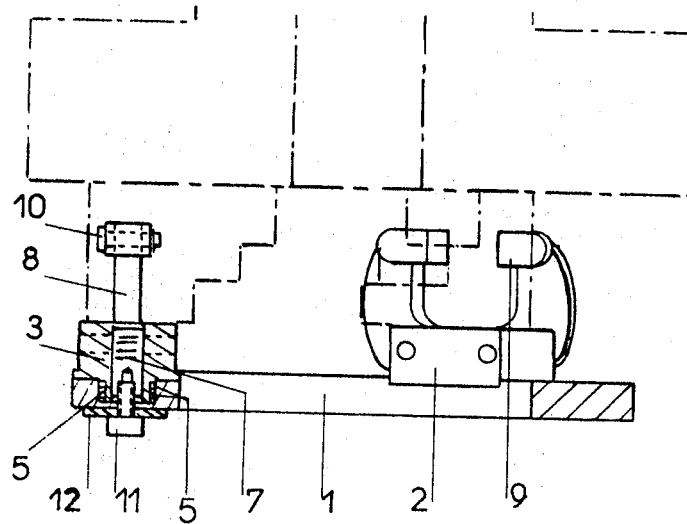
Fig.2
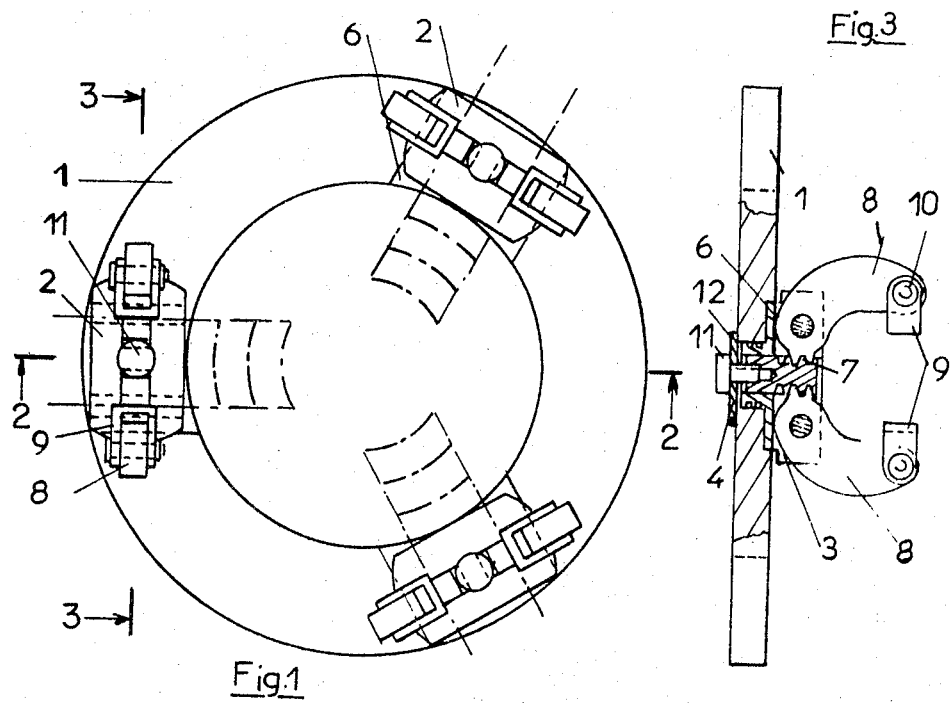
Fig.3
Fig.1

APPARATUS FOR HOLDING CHUCK JAWS FOR SHAPING

The present invention has for its object a special apparatus making possible the retouching of the bearings of the jaws of conventional chucks generally used on the headstocks of machine tools such as lathes and grinding machines.

This apparatus can be used as well for retouching hard jaws of treated steel as for soft jaws since it allows to sufficiently free the bearings of the jaws to permit their machining either by a tool or by a grinding wheel.

In conventional chucks the tightening and the loosening of the jaws are generally controlled by a disc disposed inwardly to the chuck, disc which can turn concentrically with this mandrel and having spiral grooves.

These grooves actuate directly and radially the movement of the jaws.

If the positioning of the spiral grooves is practical and universally used in chucks, it is not however of a great precision and does not allow, when a good concentricity is sought, for example in the machining of hollow cylinders between inner and outer diameters, to obtain this result if the operator is forced to disassemble and assemble the workpiece between the machining of the two diameters.

The retouching of soft or hard jaws is a conventional operation in turning or grinding which makes it possible to avoid the unprecision of the concentricity of gripping of the jaws, these being precisely at the diameter they must grip and requiring only a minimum of displacement of the spiral grooves of the disc of the chuck to ensure gripping of the part to be machined.

To effect the retouching of the jaws of the chuck in the conventional manner, a disc of a calculated diameter must be first machined and gripped by the jaws of the mandrel this gripping having to leave accessible to the tool or the grinding wheel the jaws in their part to be touched.

The jaws are then retouched while they are radially stressed along the generatrices of the disc. The retouching finished it is necessary to free the disc by displacing the jaws to a minimum and then to grip them against the part to be machined, still with the minimum displacement of the jaws and of the disc with spiral grooves which has been mentioned above.

The operation thus conducted is delicate and requires a certain ability on the part of the operator without thereby eliminating totally the risk of poor concentricity in gripping of the jaws.

The apparatus object of the present invention precisely has for its purpose to render this operation less delicate and to obtain an accurate result without particular precautions.

It can be readily put into place. The retouching operation takes place without blocking stress on the jaws and consequently without requiring turning the disc with spiral grooves to free the grooves from their retouching position.

It is no longer necessary to make the disc intended for blocking the jaws in view of this operation.

The characteristics of the invention will appear more clearly from the description given below and from examination of the different accompanying figures.

FIG. 1 is a front view of the apparatus on which appear in dotted lines the jaws of the chuck.

FIG. 2 is a cross section of the apparatus taken on the line 2—2 in Fig. 1 with the chuck shown in dotted lines.

FIG. 3 is a partial cross section taken on the line 3—3 in Fig. 1.

The following description is given by way of example for an apparatus usable with chucks with three jaws but is is evident that the invention is also applicable for an apparatus of the same type conceived for chucks with two or four jaws.

An annular support disc 1 serves as a support to three identical gripping assemblies 2, positioned on one side of disc 1 at 120° from one another along the same radius.

Each gripping or pincer assembly 2, comprises of a body 3, having a cylindrical stud or portion 4 passing through a bore in support disc 1 (Fig. 2 and 3). This stud 4 is slightly smaller than the thickness of disc 1 and of a diameter such that a substantial play subsists between it and the bore of the disc. This stud 4 comprises two toroidal elements 5 forcing slightly in the bore of disc 1 and consequently ensuring the centering of body 3 in disc 1 but in a flexible manner. Body 3 (Fig. 3) is embedded along a certain thickness in the surface of disc 1 which comprises for this purpose three radial mortices 6.

Each gripping assembly 2 is thus circularly centered on disc 1 but flexibly in a radial direction. Each body 3 has in its axis a bore in which slides a cylindrical rack 7 operable axially and having a taphole in the back.

Rack 7 acts through its teeth on a pair of jaws 8 symmetrically positioned on body 3, and constructed as arcuate sector gears.

All the jaws 8 have at their outer or free end a pusher 9, in the shape of a yoke pivoted to the core of shaft 10.

In the back of support disc 1, three screws 11 with hollow six-sided head are screwed in the taphole behind each rack 7 and each have a support washer 12 (FIGS. 2—3).

Support disc such as 1, of scaled diametric dimensions and using the same gripping assemblies, are provided for the retouching the jaws of the chucks from the smallest to the largest size.

The placing of the apparatus on the chuck for turning or grinding of the jaws takes place as follows:

The disc support 1 is positioned in front and approximately in the axis of the chuck, the side having the clamps 8 open facing the jaws of the chuck.

Pushers 9 of clamps or jaws 8 are placed flat against the lateral sides of the three jaws of the chuck.

The three screws 11 are tightened progressively. The centering of the apparatus on the chuck takes place automatically.

The blocking of the three screws 11 finished, the three jaws are immobilized without stress one relative to the other and relative to the chuck itself. They can then undergo the operation of retouching.

To remove the apparatus after this operation it suffices to unblock the three screws 11.

What I claim is:

1. Apparatus for releasably retaining jaws of a chuck temporarily immobile in selected relative positions comprising a support member, a plurality of pincer assemblies disposed angularly spaced on said support, each pincer assembly comprising a pair of pivotably mounted jaws, means pivotally mounted said jaws, adjust means on each pincer assembly operable axially in opposite directions for selectively actuating said pair of jaws in a direction for closing said jaws and in opposite direction for opening said pair of jaws, each pair of jaws of each pincer assembly comprising a pair of sector gears, and said adjust means comprising a gear rack cooperating with said sector gears and means to move the gear rack variably axially and hold it in an axial position, thereby holding the jaws in different positions relative to each other.

2. Apparatus according to claim 1, in which said pincer jaws each comprise an arcuate sector gear each having a free end for gripping, and in which said pair of sector gears are disposed symmetrically relative to said gear rack.

3. Apparatus according to claim 2, in which said means pivotally mounting said pair of sector gears comprises a body removable from said support, and means removably mounting said body on said support comprising a cylindrical portion of said body, a bore on said support for each cylindrical portion of a respective body of an individual pincer assembly allowing some radial movement of said body relative to said support, and means on said cylindrical portion centering the cylinder portion in said bore.

4. Apparatus according to claim 3, in which said body of each assembly comprises a bore and each gear rack of each pincer assembly is disposed in its respective bore for moving axially therein, and a threaded member for each pincer assembly for moving the gear rack thereof axially, and means for each pincer assembly cooperative with said threaded member thereof holding the respective assembly removably mounted on said support and in assembly in a disassemblable condition.

5. Apparatus for releasably retaining jaws of a chuck temporarily immobile in selected relative positions comprising an annular support member, a plurality of gripping assemblies disposed on one face of said support member an angularly spaced from one another, each said gripping assembly comprising a body portion flexibly mounted on said support member and a pair of pivotally mounted jaws, means pivotally mounting said jaws on said body portion and actuating means extending through said support member and operable from the side of said support member opposite the side on which said gripping assemblies are mounted, said actuating means being operable in one direction for selectively actuating said jaws in a direction for closing said jaws and operable in the opposite direction for opening said jaws.